United States Patent [19]

Nishibayashi

[11] Patent Number: 5,148,566
[45] Date of Patent: Sep. 22, 1992

[54] CONTINUOUS WASHING APPARATUS

[76] Inventor: Seitaro Nishibayashi, 2-36-1-910, Minamiohtsuka, Toshima-ku, Tokyo, Japan

[21] Appl. No.: 731,520

[22] Filed: Jul. 17, 1991

[51] Int. Cl.⁵ ............................................. A46B 13/04
[52] U.S. Cl. .................................. 15/3.21; 15/3.15; 15/3.19; 15/3.2; 15/21.2
[58] Field of Search ................. 15/3.1–3.21, 15/21.2

[56] References Cited

U.S. PATENT DOCUMENTS

| | | | |
|---|---|---|---|
| 703,916 | 7/1902 | Haley | 15/3.2 X |
| 3,722,401 | 3/1973 | Davidson et al. | 15/3.2 X |
| 4,970,746 | 11/1990 | Brackmann | 15/3.2 X |

Primary Examiner—Edward L. Roberts
Attorney, Agent, or Firm—Tarolli, Sundheim & covell

[57] ABSTRACT

A continuous washing apparatus is provided which comprises an elongate washing vessel 1 having an inlet 2 for receiving objects to be washed at one end thereof. An outlet 3 is provided for discharging objects W to be washed at the other end thereof. The elongate washing vessel is arranged in an inclined manner so that the inlet is located downwardly and the outlet is located upwardly. A conveyor is disposed within the washing vessel for conveying the objects from the area adjacent to the inlet toward the area adjacent to the outlet. A washing structure 14 15 is provided for washing the objects. The conveyor includes a screw body 4 rotatably mounted on the washing vessel 1, and a drive mechanism for driving the screw body. The screw body includes a continuous length of fin 5 which extends helically around the longitudinal axis of the washing vessel. Brush members 6 are attached to the fin for brushing the objects and a central bore extends through the central portion of the screw body along the longitudinal axis thereof.

4 Claims, 4 Drawing Sheets

CONTINUOUS WASHING APPARATUS

BACKGROUND OF THE INVENTION

1. Field of the Invention

The present invention relates to a continuous washing apparatus suitable for use in continuously washing a large quantity of objects to be washed, such as dishes, fruits, potatoes or the like.

2. Description of Prior Art

In a conventional continuous washing apparatus for dishes, for example, it is a usual practice to arrange dishes on a travelling conveyor in an aligned manner before washing, and then to continuously eject washing water from upper and lower nozzles onto the dishes so as to wash them. Such a conventional apparatus is disadvantageous in that, washing effect is not satisfactory since the dishes are conveyed stationarily on the conveyor, that working environment is badly affected due to splash of the washing water, and that increased cost for maintenance is required due to repeated failure of the apparatus.

In order to overcome the above disadvantages, a various proposals have been made. One of the examples is disclosed in Japanese Patent Public Disclosure (KOKAI) No. 51-112565.

According to the apparatus in the Public Disclosure, objects to be washed, which have been supplied into the water vessel through a hopper, are conveyed by means of a screw which is rotatably driven by a motor, so as to be washed in a frame having bars. Dirty water or sewage is dissolved into the water in the water vessel through the bars of the frame, while the objects are conveyed along the inclination of the frame having bars and are dewatered when emerging from the water level and are consequently discharged continuously from a chute.

It is noted, however, that, in the above conventional continuous washing apparatus, if a large quantity of objects to be washed is supplied through the hopper, the screw is forced to convey a large quantity of objects at one time. Thus, such a conventional apparatus has disadvantages in that washing effect is decreased, that the objects tend to be damaged and that durability of the washing apparatus is lowered since the motor and the screw are subjected to a higher load.

SUMMARY OF THE INVENTION

The present invention is intended to solve the above problems by providing a continuous washing apparatus which prevents objects to be washed from incurring damage even if a large quantity of objects is supplied and which presents an improved washing effect.

According to the present invention, a continuous washing apparatus is provided which comprises: an elongate washing vessel having an inlet for receiving objects to be washed at one end thereof, and an outlet for discharging the objects at the other end thereof, the elongate washing vessel being arranged in an inclined manner so that the inlet is located downwardly and the outlet is located upwardly; a conveying means disposed within the washing vessel for conveying the objects from the area adjacent to the inlet toward the area adjacent to the outlet; a washing means for washing the objects; the conveying means including a screw body rotatably mounted on the washing vessel, and a drive mechanism for driving the screw body; the screw body including a continuous length of fin which extends helically around the longitudinal axis of the washing vessel, brush members attached to the fin for brushing the objects and a central bore extending through the central portion of the screw body along the longitudinal axis thereof.

In operation of the continuous washing apparatus of the invention, when the fin is rotated, the objects to be washed are conveyed from the inlet of the washing vessel to the outlet thereof. In this connection, the objects are continuously conveyed by the fin by an amount which corresponding to the width of the fin. During forward movement of the objects, excess amount of the objects which exceeds the width of the fin fall into the central bore. Thus, a constant quantity of the objects corresponding to the width of the fin is conveyed. The objects are washed by the washing means and the brush members during their course of conveyance by means of the fin. It is specifically noted that the objects are brushed by the brush members while they are conveyed by the fin from the inlet to the outlet. Foreign matter having been rinsed out from the objects move toward the inlet area through the small apertures and through the space between the fin and the washing vessel.

BRIEF DESCRIPTION OF THE DRAWINGS

The above noted and other features of the invention will be better understood from the following detailed description when considered with reference to the accompanying drawings in which.

DETAILED DESCRIPTION OF THE INVENTION

Figure 1:
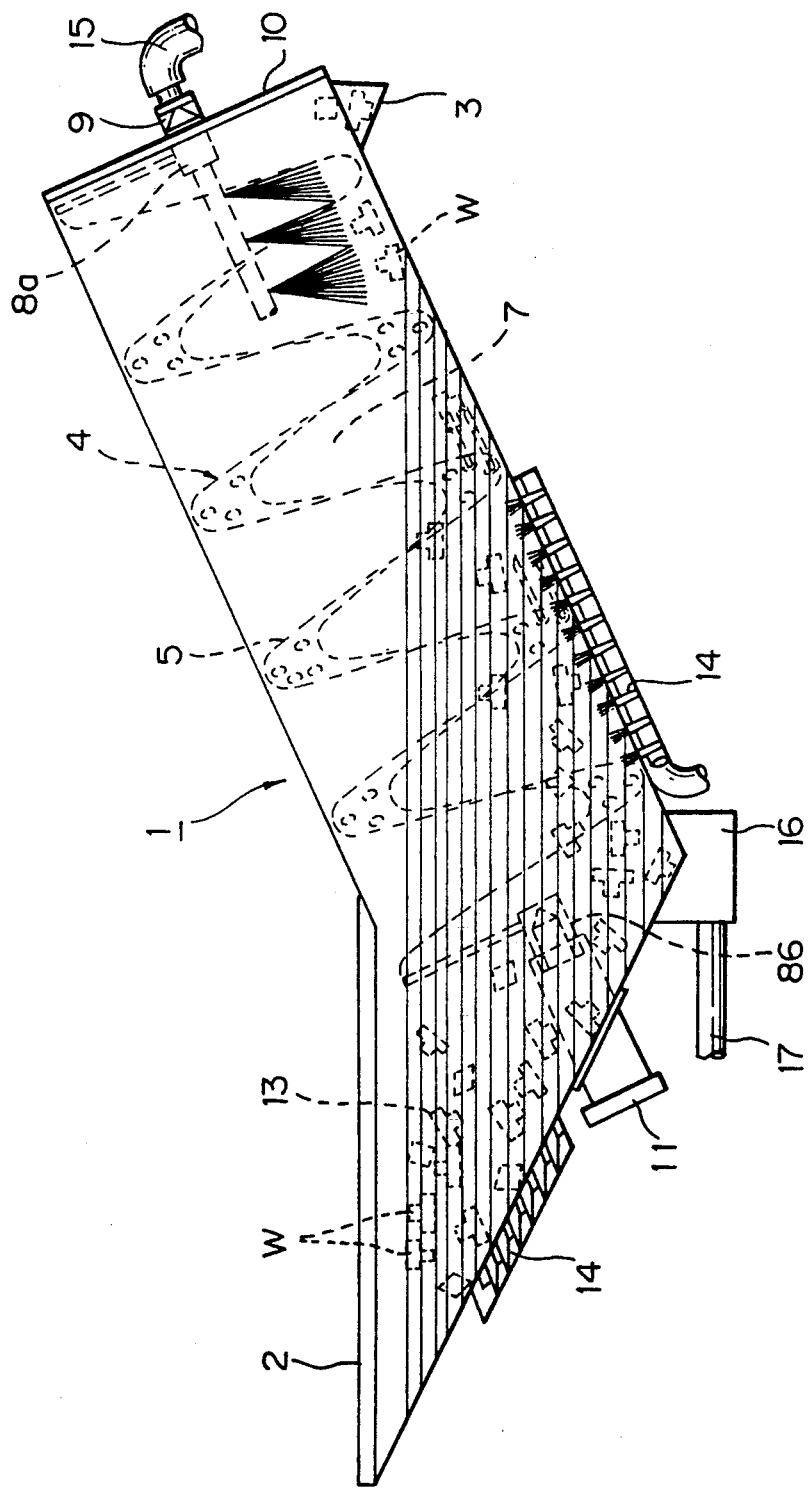
FIG. 1 is a side elevational view of one embodiment of a continuous washing apparatus according to the invention.

A continuous washing apparatus according to one embodiment of the invention comprises an elongate washing vessel 1. The washing vessel 1 includes an inlet 2 for receiving objects (materials to be washed) W at one end thereof and an outlet 3 for discharging the objects W at the other end, as shown in FIG. 1. The washing vessel 1 is arranged in an inclined manner so that the inlet 2 is located at a position lower than that of the outlet 3.

Means for conveying the objects W from the inlet area to the outlet area is provided in the washing vessel 1. The conveying means includes a screw body 4 rotatably mounted to the washing vessel 1 and a drive mechanism (not shown) for driving the screw body 4. The screw body 4 includes a continuous length of fin 5 extending helically along the longitudinal axis of the washing vessel 1, a series of brush members 6 extending along the outer periphery of the fin 5 and a central bore 7 extending centrally of the fin 5 along the longitudinal axis of the screw body 4.

Shaft 8a and 8b are secured respectively to each end of the screw body 4. One of the shafts 8a is carried by a bearing 9 which in turn is rotatably supported by a support frame 10 constituting an upper wall of the washing vessel 1. The other shaft 8b is carried by a drive shaft 11 which extends through an end wall of the washing vessel 1 and is rotatably supported by the end wall. The above-mentioned drive mechanism (not shown) is connected to the drive shaft 11 by means of a suitable transmission means.

The shaft 8a and the bearing 9, and the shaft 8b and the drive shaft 11 respectively are connected in a tapered fashion. It should be noted that, due to the taper connection between the shafts and the bearing and drive shaft, disassembladge and assembladge of the conveying means can be easily carried out without the need of alignment work. It should also be noted that, when the support frame 10 is removed, the screw body 4 is easily inserted into and dismounted from the washing vessel 1.

The aforementioned drive mechanism may comprise a motor, for example. Accordingly, the screw body 4 can be rotated upon rotation of the motor.

Figure 2:
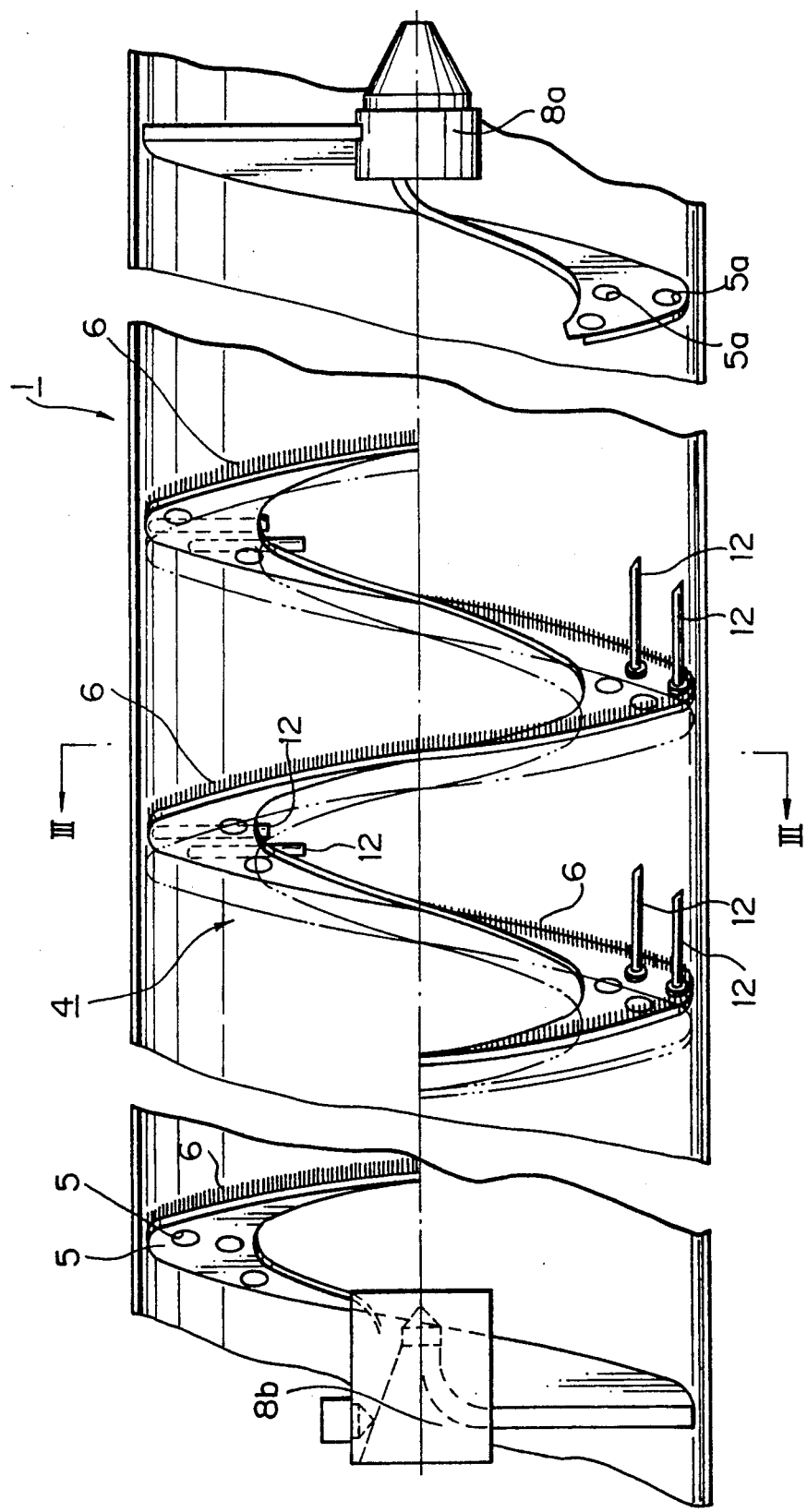
FIG. 2 is a fragmentary cross-sectional view of the apparatus shown in FIG. 1.
Figure 3:
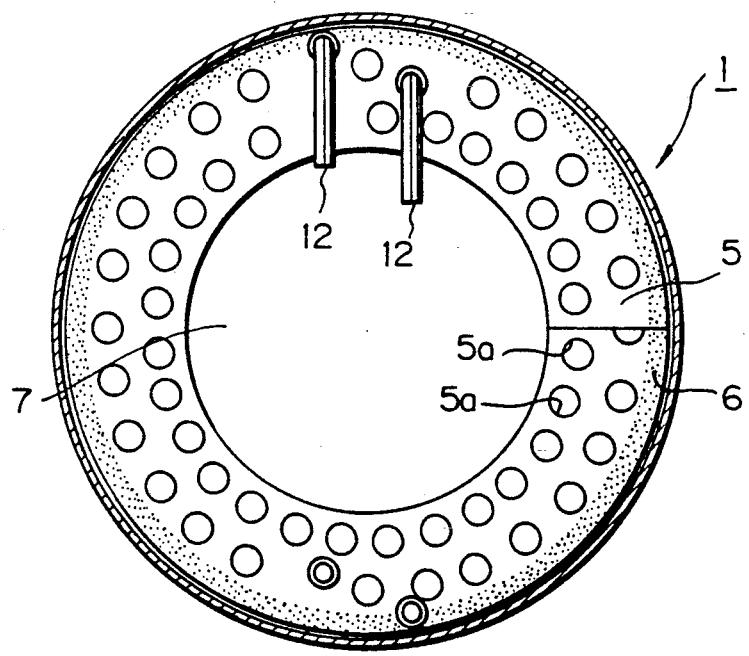
FIG. 3 is a cross-sectional view along line 3—3 in FIG. 2.

As stated above, the fin 5 for conveying the objects W includes the central bore 7 at the center thereof. This construction allows a quantity of objects W exceeding a predetermined volume to be returned to the inlet area through the central bore 7. The fin 5 is formed with a plurality of small apertures 5a. The apertures 5a contributes to reduce flow resistance between the fin and washing liquid and also to allow foreign materials other than the objects W to be returned downwardly therethrough, which foreign materials otherwise tend to be conveyed upwardly. The fin 5 is also provided with a plurality of rods 12 rotatably mounted thereto, as shown in FIGS. 2 and 3. The rods 12 serve to roll the objects W during the course of the objects to be conveyed by the fin 5.

Figure 4:
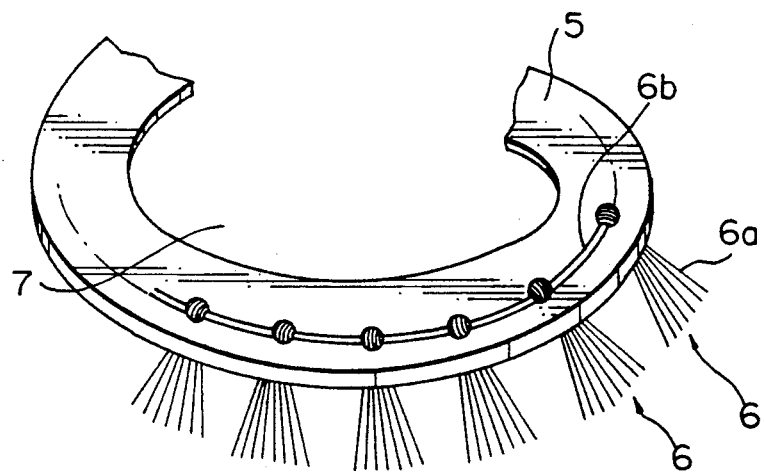
FIG. 4 is a perspective view of a part of a fin.
Figure 5:
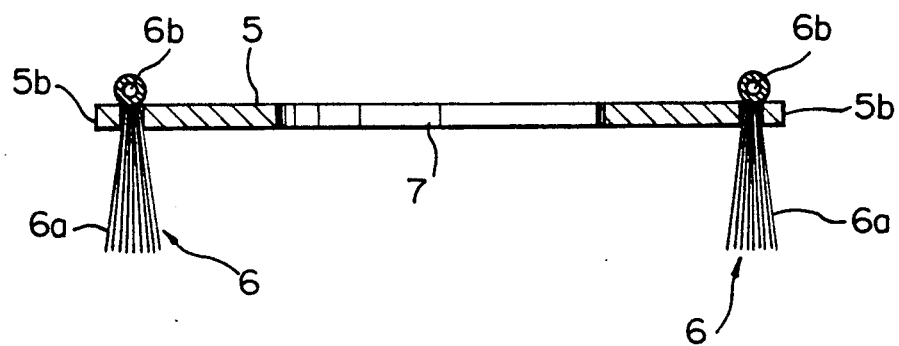
FIG. 5 is a cross-sectional view of the fin.

The brush members 6 serve to brush the objects W during the course of the objects to be conveyed by means of the fin, thus increasing the washing effects of the apparatus. Each of the brush member 6 is formed by a bundle of wires made of, for example synthetic resins or metals. The brush members 6 are provided at the surface of the fin, excepting the area adjacent to the inlet 2 and the area adjacent to the outlet 3, as shown in FIG. 2. In the illustrated embodiment, the brush members 6 are attached to the outer periphery of the fin 5 so as to extend substantially vertically to the surface of the fin. More specifically, for example and as shown in FIGS. 4 and 5, each brush member 6 is fixed to the outer periphery of the fin 5 by (a) folding back a bundle of wires 6a in two, (b) inserting the folded bundle 6a into an attachment hole 5b in the fin 5 so that the annular portion, i.e., folded portion, of each of the bundle 6a is positioned at one side of the fin 5, and (c) inserting a length of wire 6b into the annular portion of each of the bundle 6a so as to secure the bundles to the fin 5. When the brush members 6 are attached to the fin 5 in the above manner, attachment and detachment of the brush member 6 can be easily carried out during maintenance thereof.

The washing vessel 1 is provided with a washing means. In the illustrated embodiment, the washing means comprises an air injection pipe 14 for ejecting therefrom air into the washing liquid 13 at a portion adjacent to the inlet area (lower portion) of the washing vessel 1. The washing means may further comprise, in addition to the air injection pipe 14, a washing liquid injection pipe 15 for ejecting therefrom washing liquid. One end of the washing liquid injection pipe 15 extends through the bearing 9 and the shaft 8a into the inside of the washing vessel 1. A plurality of apertures for ejecting warm water or clean water therefrom are provided at the one end of the washing liquid injection pipe 15.

A basin 16 for collecting therein foreign materials, which may occur during washing of the objects W, is provided at the bottom of the washing vessel 1. The basin 16 is connected with a discharge pipe 17.

Operation of the continuous washing apparatus according to the embodiment as constructed above will be explained hereinbelow:

After the objects W have been input through the inlet 2, the motor is driven to rotate the fin 5 and air is ejected from the air injection pipe 14. Then, the objects W are directed toward the fin 5 by means of the air ejected from the air injection pipe 14. A quantity of the objects W corresponding to the width of the fin 5 is conveyed, one after another, by means of the fin 5 to the outlet area.

During conveyance of the objects, a quantity of the objects exceeding the width of the fin 5 is fallen into the central bore 7 so that a constant quantity of the objects corresponding to the width of the fin 5 is conveyed. Washing water is ejected from the washing liquid injection pipe 15. The objects W become "floated" by means of the air ejected from the air injection pipe 14 and "rolled" so as to be washed.

It should be noted that, during conveyance of the objects W, they are continuously changed in their direction of orientation by means of the fin 5, while, at the same time, they are rolled by the plurality of rods 12 rotatably attached to the fin 5, thus increasing washing effects. Furthermore, and during conveyance of the objects W, they are continuously brushed by the brush members 6 attached or implanted to the fin 5, thus the washing effects are further enhanced. The brushing action of the brush members 6 is specifically effective when the objects W is planar material such as dishes or the like.

Foreign materials washed from the objects W are moved back downwardly through the plurality of small apertures 5a in the fin 5 and the clearance between the fin 5 and the washing vessel 1.

The objects W having been washed are continuously conveyed upwardly by means of the fin 5 and then are rinsed out with warm water or clean water from the washing liquid injection pipe 15 and thereafter are discharged from the outlet 3.

According to another embodiment, an ultrasonic washing means may be attached to the outlet 3 of the washing vessel 1, the ultrasonic washing means being provided with a dryer device. Accordingly, the objects W discharged from the outlet 3 of the washing vessel 1 may be washed more cleanly and may be dried by the dryer device.

In accordance with the present invention, the washing apparatus comprises an inclined washing vessel having an inlet for receiving objects to be washed and a fin supported by opposite ends of the washing vessel for rotational movement thereof, the fin being provided with a plurality of brush members at the outer periphery thereof, the fin being formed with a central bore along the longitudinal axis thereof. Due to this construction, several advantages can be brought about as follows:

(a) The fin of the screw body is supported by the washing vessel only at opposite ends thereof. Accordingly, the fin has flexibility in substance which tends to prevent from affecting damages on the objects. Likewise, no substantially large load is applied to the entire apparatus, thus increasing durability of the apparatus;

(b) Due to the disposition of the brush members at the outer periphery of the fin, the objects to be washed are continuously brushed thereby during conveyance of the objects, thus washing effects are increased;

(c) Since the central bore is formed in the central portion of the fin, a constant quantity of the objects can be conveyed and therefore, even if a large quantity of objects is input into the outlet at one time, a constant quantity of objects is always conveyed;

(d) The objects are continuously changed in their direction of orientation by means of the fin, so that the washing effects can be also enhanced; and (e) Since a plurality of small apertures is formed in the fin, flow resistance between the fin and washing liquid is reduced and foreign matters other than the objects can be moved back downwardly, which otherwise tend to be conveyed upwardly.

What is claimed is:

1. A continuous washing apparatus comprising:

an elongate washing vessel having an inlet for receiving objects to be washed at one end thereof, and an outlet for discharging the objects at the other end thereof, said elongate washing vessel being arranged in an inclined manner so that the inlet is located downwardly and the outlet is located upwardly;

a conveying means disposed within said washing vessel for conveying said objects from the area adjacent to said inlet toward the area adjacent to said outlet;

a washing means for washing said objects;

said conveying means including a screw body rotatably mounted in said washing vessel, and a drive mechanism for driving said screw body;

said screw body including a continuous length of fin which extends helically around the longitudinal axis of said washing vessel, brush members attached to said fin for brushing said objects and an open central bore extending through the central portion of said screw body along the longitudinal axis thereof.

2. A continuous washing apparatus according to claim 1, wherein said washing vessel is designed so that washing liquid is retained at said inlet area.

3. A continuous washing apparatus according to claim 1, wherein said fin is formed with a plurality of small apertures.

4. A continuous washing apparatus according to claim 1, wherein each of said brush members is formed from a bundle of wires.

* * * * *